Patented June 21, 1938

2,121,617

UNITED STATES PATENT OFFICE 2,121,617

ESTERS OF SULPHATO-CARBOXYLIC ACIDS

James Herbert Werntz, Wilmington, Del., assignor to E. I. du Pont de Nemours & Company, Wilmington, Del., a corporation of Delaware No Drawing. Application June 10, 1937,
Serial No. 147,486

17 Claims. (Cl. 260—99.12)

This invention relates to new chemical compounds, their methods of production and their technical uses, and more particularly to the manufacture and utilization of secondary straight chain alkyl esters of mono-sulphato-polycarboxylic acids wherein the alkyl groups contain 6 or more carbon atoms and the sulphato-polycarboxylic acids contain less than 15 carbon atoms and have no hydroxyl substituents.

This application is a continuation-in-part of my co-pending application, Serial Number 757,465, filed December 14, 1934, which became U. S. Patent No. 2,104,782 on January 11, 1938.

This invention has as an object the preparation of a number of new chemical compounds which have surface active properties. A further object is to manufacture these new chemical compounds by novel and easily conducted processes from relatively inexpensive raw materials. A still further object is to apply these new compounds in various connections wherein surface active compounds are commonly employed. Other objects will appear hereinafter.

These objects are accomplished by the following invention which relates generally to the production of secondary straight chain dialkyl esters of aliphatic mono-sulphato-dicarboxylic acids wherein the alkyl groups contain 6 or more carbon atoms and the sulphato-dicarboxylic acids contain less than 15 carbon atoms and have no hydroxyl substituents. In the preferred embodiment these objects are accomplished by the production of esters of aliphatic mono-sulphato-dicarboxylic acids having from 3 to 6 carbon atoms and having no hydroxyl substituents with secondary straight chain aliphatic alcohols having 6 or more carbon atoms.

The following examples will serve to illustrate this invention.

Example 1

Sodium di(octyl-2) sulphato-succinate.—17.9 parts by weight of di(octyl-2) malate, which boiled at 170–173° C. at 3 mm., was dissolved in 72 parts by weight of anhydrous ethyl ether, and the solution placed in a reaction vessel equipped with an agitator, thermometer and dropping funnel. 5.84 parts by weight of chlorosulphonic acid were added slowly to the ether solution maintained at 0° C. by means of an ice bath. The reaction mixture was stirred 2½ hours, then poured into ice water, and neutralized with a 4% aqueous sodium hydroxide solution. The aqueous solution was extracted with ether, the ether extract dried with anhydrous sodium sulphate, filtered, and the ether evaporated at room temperature. 19 parts by weight of a light colored, syrupy, product was obtained after drying over phosphorus pentoxide in a vacuum desiccator. The sodium di(octyl-2) sulphato-succinate analyzed 6.4% sulphur indicating a purity greater than 92%. This product was found to be a very efficient wetting agent for cotton yarn.

Example 2

Sodium di(octyl-3) sulphato-succinate.—17.9 parts by weight of di(octyl-3) malate was dissolved in 72 parts by weight of anhydrous ethyl ether and sulphated with 6.4 parts by weight of chlorosulphonic acid under the conditions described in the preceding example for the preparation of sodium di(octyl-2) sulphato-succinate. 23 parts by weight of sulphated ester were obtained which analyzed 6.4% sulphur and indicated a purity greater than 91%. This product is an efficient wetting agent for cotton textiles.

The di(octyl-3) malate was prepared by esterifying octanol-3 with malic acid using a catalytic amount of paratoluene sulphonic acid and ethylene dichloride as the solvent for removing the water liberated during the course of the reaction. The product was purified by washing the ethylene dichloride solution with water and distilling off the ethylene dichloride. The product was a water-white oil, and was therefore not distilled prior to the sulphation.

Example 3

Sodium di(hexyl-3) sulphato-succinate.—15.1 parts by weight of di(hexyl-3) malate, which distilled at 150–155° C. at 2 mm., was dissolved in 36 parts by weight of anhydrous ethyl ether, and the solution placed in a reaction vessel equipped with an agitator, dropping funnel, and thermometer. A solution of 5.84 parts by weight of chlorosulphonic acid was prepared by dissolving the acid in 36 parts by weight of anhydrous ethyl ether, and the acid solution allowed to drop slowly into the solution of the ester. After addition of the acid, the solution was stirred for an additional 2 hours at about 0° C. It was then poured into 200 grams of ice and neutralized with a 4% aqueous sodium hydroxide solution. The sulphated ester was only sparingly soluble in ethyl ether, so the ether layer was removed and the sulphated ester in the aqueous solution evaluated as a wetting agent. It displayed wetting properties for cotton textiles but in this respect was inferior to sodium di(octyl-3) sulphato-succinate.

The esters which are to be sulphated may be prepared from any secondary straight chain aliphatic alcohol containing 6 or more carbon atoms. Such secondary aliphatic alcohols may be obtained by hydrating straight chain olefins such as those produced by the cracking of petroleum products followed by separation of the branched chain olefins. A few of the secondary straight chain aliphatic alcohols which are useful in this connection are the various isomeric normal secondary hexanols, heptanols, octanols, nonanols, decanols, undecanols, dodecanols, tridecanols, tetradecanols, pentadecanols, hexadecanols, heptadecanols, and octadecanols, specific examples of which are hexanol-3, heptanol-2, octanol-2, octanol-3, nonanol-3, nonanol-4, nonanol-5, decanol-5, undecanol-3, undecanol-6, tridecanol-7, pentadecanol-8, heptadecanol-4, etc. In the preparation of wetting agents for cotton textiles, it is preferred to prepare the esters which are to be sulphated from straight chain secondary alcohols containing from 6 to 10 carbon atoms. Starting out in this manner, there may be obtained secondary straight chain dialkyl esters of sulphatosuccinic acid wherein the alkyl groups contain from 6 to 10 carbon atoms. In place of individual alcohols, mixtures thereof may be used, the various components of which may vary from traces to major fractions.

While the esters which are to be sulphated may be made from any monohydroxy polycarboxylic acid which contains less than 15 carbon atoms, it is preferred to use acids having from 3 to 8 carbon atoms. Aromatic acids, such as 3-hydroxy orthophthalic and 4-hydroxy orthophthalic, and tricarboxylic acids, such as citric, may be used in this connection, but generally they are not to be preferred. For instance, a di(octyl-2) hydroxy phthalate may be prepared from one of the hydroxy phthalic acids and converted with chlorosulphonic acid to a di(octyl-2) sulphato-phthalate. It is generally preferred, however, to make the esters which are to be sulphated from aliphatic monohydroxy dicarboxylic acids containing from 3 to 6 carbon atoms such as tartronic, malic, methyl tartronic, ethyl tartronic, beta-methyl malic, alpha-hydroxy glutaric, beta-hydroxy glutaric, alpha-hydroxy adipic, beta-beta-dimethyl malic, beta-ethyl malic, etc. At present I prefer to use malic acid for preparing the esters to be sulphated above any of the other acids mentioned in this paragraph.

Esters which are to be sulphated may be prepared by any method known to the art, e. g., by reacting the alcohol or the alkali metal alcoholate with the acid, acid chloride, or acid anhydride, or by ester interchange. Usually the esters to be sulphated are prepared by esterifying all of the carboxyl groups of the particular polycarboxylic acid employed with a secondary straight chain aliphatic alcohol containing 6 or more carbon atoms. Esters which are to be sulphated may also be made in which only one of the carboxyl groups is esterified with a secondary straight chain alcohol having 6 or more carbon atoms. Each of the carboxyl groups of a dicarboxylic acid may be esterified with the same or with different alcohols. In the case of the esters employed for making the products described in the above examples, both of the carboxyl groups of the acid have been esterified with the same secondary alcohol. Esters to be sulphated may also be obtained by esterifying one carboxyl group of a dicarboxylic acid with a normal secondary alcohol containing 6 or more carbon atoms and the other carboxyl group with a dissimilar alcohol such as ethanol, butanol, cyclohexanol, normal octanol, 2-ethylhexanol-1, 4-methyl hexanol-1, etc. I at present prefer to prepare the esters which are to be sulphated by esterifying both of the carboxyl groups of a monohydroxy dicarboxylic acid containing from 3 to 6 carbon atoms—especially malic acid—with a secondary straight chain aliphatic alcohol containing 6 or more carbon atoms.

Esters prepared as indicated in the preceding paragraph or by any other suitable method may be sulphated by means of such sulphating agents as concentrated sulphuric acid, oleum, chlorosulphonic acid, pyridine sulphuric acid, etc. Sulphation may be carried out in the presence of solvents or diluents, such as water, aliphatic hydrocarbons, ethyl ether, carbon tetrachloride, nitrobenzene, trichloroethylene, symmetrical dichloro-ethyl ether, etc. Sulphation is advisably carried out within the temperature range of from —20° C. to 35° C. in order to avoid the formation of sulphonic acids. As indicated by the above examples, it is preferred to carry out the sulphation in dry ether solution by means of chlorosulphonic acid at a temperature of about 0° C.

Sulphated esters produced in accordance with the foregoing directions are usually neutralized with salt-forming compounds or bases, which may be inorganic or organic. All of the free acid groups present in the molecule may be reacted with such bases, although it is contemplated that products containing a free sulphate or carboxyl group may be produced and utilized. It is generally preferred to neutralize the sulphated esters with an alkali metal hydroxide, such as sodium hydroxide, in order to obtain their alkali metal salts. I may also use inorganic bases such as soda ash, ammonium hydroxide, potassium hydroxide, lithium hydroxide, magnesium hydroxide, calcium hydroxide, and barium hydroxide for neutralizing the sulphated esters. Amines such as aniline, toluidine, cyclohexyl amine, pyridine, piperidine, dimethyl amine, ethyl amine, diethanol amine, butyl amine, triethanol amine, glucamine, methyl glucamine, etc. may also be used for neutralizing these sulphated esters.

When in the claims I refer to esters of mono-sulphato-polycarboxylic acids, it is to be understood that such an expression generically denotes the sulphated esters comprehended by the present invention irrespective of whether or how the sulphated esters may be neutralized.

By the expression "ester of a mono-sulphato-polycarboxylic acid", I refer to esters in which one neutralized or unneutralized sulphate group is attached to a carbon atom on the acid residue.

The new compositions covered in this case belong to the class of surface active or capillary active materials in that they have colloidal properties and may, therefore, be advantageously used in any process involving wetting, penetrating, deterging, dispersing, emulsifying, frothing, foaming and kindred phenomena. These compositions may be employed in pure or standardized form, and, if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials.

A few representative uses of these new products as textile assistants will be mentioned in order that the importance and widespread applicability of these new products in the textile industries may be fully appreciated. They may be used alone or in combination with suitable detergents for cleansing and scouring vegetable and animal fibers when removing fatty or oily materials. When added to flax retting baths, they function as wetting and penetrating agents. They may be employed as assistants in fulling and felting processes. They may be used in sizing preparations in combination with the usual materials such as starches or gelatine or their equivalents, clays, talcs, weighting salts such as magnesium sulphate or calcium chloride, oils and oils processed by oxidation, polymerization, sulphonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, water-proofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry these compositions function as useful wetting agents in soaking, deliming, bating, tanning, and dyeing baths. They are useful in softening and treating baths for hides and skins, particularly in baths used for fat-liquoring leather. Solutions of these compounds are useful for pretreating leather prior to dyeing.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, slightly acid, or slightly alkaline liquors. They may be used for paint, varnish, and lacquer cleaners. They may advantageously be employed as cleansing agents in hard water and where a fatty or oily film resists the ordinary cleansing media. They may be added to soap in hard water baths, since these compositions do not form precipitates so readily in hard waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes, and in other processes such as the recovery of fixed oil from the oil sands. These compounds may be used in toothpaste, non-spattering margarins and may be employed as emulsifying agents for synthetic rubber latex such as neoprene.

The above description and examples are intended to be illustrative only and not to limit the scope of the invention. Any departure therefrom which conforms to the spirit of the invention is intended to be included within the scope of the appended claims.

I claim:

1. A secondary straight chain neutral alkyl ester of a mono-sulphato-polycarboxylic acid wherein the alkyl group contains at least 6 carbon atoms and the sulphato-polycarboxylic acid contains less than 15 carbon atoms and has no hydroxyl substituents.

2. A secondary straight chain dialkyl ester of an aliphatic mono-sulphato-dicarboxylic acid wherein the alkyl groups contain at least 6 carbon atoms and the sulphato-dicarboxylic acid contains less than 15 carbon atoms and has no hydroxyl substituents.

3. An alkali metal salt of a secondary straight chain dialkyl ester of an aliphatic mono-sulphato-dicarboxylic acid wherein the alkyl groups contain at least 6 carbon atoms and the sulphato-dicarboxylic acid contains from 3 to 6 carbon atoms and has no hydroxyl substituents.

4. A process of making the products defined in claim 3 which comprises sulphating a secondary straight chain dialkyl ester of an aliphatic monohydroxy dicarboxylic acid wherein the alkyl groups contain at least 6 carbon atoms and the dicarboxylic acid contains from 3 to 6 carbon atoms, and neutralizing the sulphated ester with an alkali metal hydroxide.

5. A secondary straight chain dialkyl ester of sulphato-succinic acid wherein the alkyl groups contain at least 6 carbon atoms.

6. An alkali metal salt of a secondary straight chain dialkyl ester of sulphato-succinic acid wherein the alkyl groups contain at least 6 carbon atoms.

7. A process of making the products defined in claim 6 which comprises sulphating a secondary straight chain dialkyl ester of malic acid wherein the alkyl groups contain at least 6 carbon atoms, and neutralizing the sulphated malate ester with an alkali metal hydroxide.

8. A secondary straight chain dialkyl ester of sulphato-succinic acid wherein the alkyl groups contain from 6 to 10 carbon atoms.

9. An alkali metal salt of a secondary straight chain dialkyl ester of sulphato-succinic acid wherein the alkyl groups contain from 6 to 10 carbon atoms.

10. A process of making the products defined in claim 9 which comprises sulphating a secondary straight chain dialkyl ester of malic acid wherein the alkyl groups contain from 6 to 10 carbon atoms by reacting an ether solution of said ester with chlorosulphonic acid, and neutralizing the sulphated ester with an aqueous solution of an alkali metal hydroxide.

11. A di(octyl-3) sulphato-succinate.

12. Sodium di(octyl-3) sulphato-succinate.

13. A process of making sodium di(octyl-3) sulphato - succinate which comprises adding chlorosulphonic acid to a dry ether solution of di(octyl-3) malate, stirring the reaction mixture, and neutralizing the sulphated malate ester with an aqueous solution of sodium hydroxide.

14. A di(octyl-2) sulphato-succinate.

15. Sodium di(octyl-2) sulphato-succinate.

16. A di(hexyl-3) sulphato-succinate.

17. Sodium di(hexyl-3) sulphato-succinate.

JAMES HERBERT WERNTZ.